(12) United States Patent
Iwagami et al.

(10) Patent No.: US 8,413,326 B2
(45) Date of Patent: Apr. 9, 2013

(54) ASSEMBLING METHOD FOR TIMING SYSTEM OF ENGINE

(75) Inventors: Takeyoshi Iwagami, Aki-gun (JP);
Akihiro Noda, Hatsukaichi (JP); Yuzou Uotani, Higashihiroshima (JP)

(73) Assignee: Mazda Motor Corporation (JP)

( * ) Notice: Subject to any disclaimer, the term of this patent is extended or adjusted under 35 U.S.C. 154(b) by 1052 days.

(21) Appl. No.: 12/409,205

(22) Filed: Mar. 23, 2009

(65) Prior Publication Data

US 2009/0235524 A1   Sep. 24, 2009

(30) Foreign Application Priority Data

Mar. 24, 2008   (JP) ................................. 2008-074873

(51) Int. Cl.
*B21K 3/00*   (2006.01)
(52) U.S. Cl. ........ 29/888.01; 29/426.5; 29/434; 29/468; 123/90.15; 123/90.17; 123/90.31; 474/101; 474/109; 474/110
(58) Field of Classification Search .................. 29/426.5, 29/468, 434, 888.01; 123/90, 90.15, 90.17, 123/90.27, 90.31, 101, 109, 110, 138; 474/101, 474/109, 110, 138
See application file for complete search history.

(56) References Cited

U.S. PATENT DOCUMENTS

| | | | |
|---|---|---|---|
| 4,373,240 A * | 2/1983 | Castoe ......................... | 29/426.5 |
| 5,184,401 A * | 2/1993 | Hirose et al. ............... | 29/888.01 |
| 6,932,039 B2 * | 8/2005 | Takahashi et al. ......... | 123/90.17 |
| 7,174,799 B2 * | 2/2007 | Yoshida et al. ............. | 474/110 |
| 2005/0278948 A1 | 12/2005 | Zielke | |

FOREIGN PATENT DOCUMENTS

| | | |
|---|---|---|
| DE | 19959521 A1 | 6/2001 |
| DE | 10244894 A | 5/2003 |
| DE | 20207186 U1 | 9/2003 |
| EP | 0656464 A | 6/1995 |
| EP | 0987405 A | 3/2000 |
| EP | 1099827 A | 5/2001 |
| EP | 1106789 A | 6/2001 |
| EP | 1843020 A | 10/2007 |
| GB | 2424936 A | 10/2006 |

(Continued)

OTHER PUBLICATIONS

European Search Report dated Jul. 23, 2009; Application No./Patent No. 09155810.6-2311.

(Continued)

*Primary Examiner* — Richard Chang
(74) *Attorney, Agent, or Firm* — Studebaker & Brackett PC; Donald R. Studebaker (57) ABSTRACT

Disclosed is an assembling method for a timing system of an engine to wind a timing chain (30) around a sprocket (20) attached to a crankshaft (18) and a sprocket (24, 28) attached to a camshaft (22, 26). The assembling method comprises the steps of: winding the timing chain (30) around the respective sprockets (20, 24, 28) while aligning a reference mark provided on a respective one of the sprockets (20, 24, 28), with a corresponding one of alignment marks provided on the timing chain (30) in associated relation with respective ones of the reference marks; preliminarily assembling, to an engine body (12), a chain guide (32) adapted to be brought into contact with a tight side (30a) of the timing chain (30); positioning the crankshaft (18) and the camshaft (22, 26) at corresponding reference phase positions; and finally assembling the preliminarily-assembled chain guide (32) to the engine body (12), while bringing the chain guide (32) into contact with the tight side (30a) of the timing chain (30) with a given pushing force.

20 Claims, 8 Drawing Sheets

FOREIGN PATENT DOCUMENTS

| | | |
|---|---|---|
| GB | 2424936 A | 10/2006 |
| JP | 08135468 A | 5/1996 |
| JP | 2000-110581 A | 4/2000 |
| JP | 2004-308624 A | 11/2004 |
| JP | 2007-023846 A | 2/2007 |
| WO | 9909302 A | 2/1999 |

OTHER PUBLICATIONS

Japanese Office Action "Notice of Reasons for Rejection" issued on Sep. 6, 2011; Japanese Patent Application No. 2008-074873 with translation.

* cited by examiner

FIG.9

ASSEMBLING METHOD FOR TIMING SYSTEM OF ENGINE

BACKGROUND OF THE INVENTION

1. Field of the Invention

The present invention relates to an assembling method for an engine timing system to wind a timing chain around respective sprockets of a crankshaft and a camshaft of an engine, and belongs to the field of engine production technologies.

2. Description of the Background Art

A conventional engine timing system related to the present invention includes one type as disclosed, for example, in JP 2007-023846A. As described in this patent publication, an engine is configured to allow a camshaft formed with a cam for opening and closing an intake or exhaust valve to be rotated in interlocked relation to a rotation of a crankshaft. In overhead camshaft type engines where a camshaft is arranged in a cylinder head, a timing chain is provided to interlock a camshaft and a crankshaft. Specifically, a sprocket is fixed to one end of each of the crankshaft and the camshaft, and a timing chain is wound around the respective sprockets of the crankshaft and the camshaft, so that a rotation of the crankshaft is transmitted to the camshaft through the timing chain to allow the camshaft to be rotated in interlocked relation to the rotation of the crankshaft.

For example, this timing chain is assembled in the following manner. A reference mark is provided on each of the sprockets of the crankshaft and the camshaft in a vicinity of a given one of a plurality of teeth thereof, and, in associated relation with respective ones of the reference marks, crankshaft-alignment and camshaft-alignment marks are provided on respective given ones of a plurality of links of the timing chain. Then, the timing chain is wound around the sprockets, while aligning each of the alignment marks with a corresponding one of the reference marks. Through the mark aligning operation, the timing chain is wound around the sprockets in an adequate condition that a given number of the links are arranged between the respective reference marks of the crankshaft sprocket and the camshaft sprocket.

After completion of the timing-chain winding operation, respective phases of the crankshaft and the camshaft are kept in a given relation. Thus, in each cylinder, opening/closing timings of intake/exhaust valves relative to a piston stroke is adequately set so as to ensure a desirable engine combustion cycle, e.g., intake, compression, expansion and exhaust strokes in a four-cycle engine.

More specifically, due to dimensional variations within tolerances for links and pins of the timing chain or teeth of the sprockets, and clearance variations in a mesh zone between the timing chain and each of the sprockets just after completion of the timing-chain winding operation, which is caused by the dimensional variations and/or variations in quality of the winding operation, a camshaft phase relative to a crankshaft phase is likely to have a certain variation and deviate from an optimal phase (i.e., a phase which is perfectly in the given relation with the crankshaft phase), when the crankshaft is rotated after completion of the timing-chain winding operation, to allow the timing chain to conformably fit with each of the sprockets.

This phase deviation causes a deviation in the opening/ closing timings of the intake/exhaust valves to deteriorate engine combustion performance. Particularly, in a high-compression engine having a high effective compression ratio, such a deviation is unacceptable depending on a level thereof. The reason is that the deviation is likely to cause a pre-ignition which is a phenomenon that, when a piston is moved to a position close to a top dead center (TDC) of a compression stroke, an air-fuel mixture is auto-ignited before ignition by a spark plug.

Specifically, if the camshaft phase relative to the crankshaft phase is shifted in an advance direction to advance the closing timing of the intake valve, the piston starts a compressing action at a position closer to a bottom dead center (BDC) with respect to a desired position, and thereby an in-cylinder air-fuel mixture is more highly compressed as compared with a desired compression state. Thus, in the high-compression engine where a compression ratio is originally set, for example, at 13 or more, the pre-ignition is likely to occur due to an abnormal temperature rise caused by the adiabatic compression.

SUMMARY OF THE INVENTION

It is therefore an object of the present invention to provide an engine timing system assembling method capable of winding a timing chain around respective sprockets of a crankshaft and a camshaft of an engine in such a manner as to allow a crankshaft phase and a camshaft phase to be accurately set in a given relation.

In order to achieve this object, the present invention provides an assembling method for a timing system of an engine to wind a timing chain around a sprocket attached to a crankshaft and a sprocket attached to a camshaft. The assembling method comprises the steps of (1) assembling, to an engine body, a tensioner arm adapted to push a loose side of the timing chain, (2) winding the timing chain around the respective sprockets of the crankshaft and the camshaft, while aligning a reference mark provided on a respective one of the sprockets, with a corresponding one of alignment marks provided on the timing chain in associated relation with respective ones of the reference marks, (3) preliminarily assembling, to the engine body, a chain guide adapted to be brought into contact with a tight side of the timing chain, (4) positioning the crankshaft at a reference phase position thereof, (5) positioning the camshaft at a reference phase position thereof, and (6) finally assembling, to the engine body, the chain guide preliminarily assembled in the step (3), while bringing the chain guide into contact with the tight side of the timing chain with a given pushing force.

In the assembling method of the present invention, after winding the timing chain around the sprockets while aligning the reference mark provided on a respective one of the sprockets, with a corresponding one of the alignment marks provided on the timing chain, each of the crankshaft and the camshaft is positioned at the reference phase position thereof. Then, in this state, the chain guide preliminarily assembled to the engine body can be finally assembled to the engine body, while being brought into contact with the tight side of the timing chain with a given pushing force.

Specifically, under a condition that each of the crankshaft and the camshaft having the sprockets wound by the timing chain is positioned at the reference phase position thereof, the chain guide is finally assembled to the engine body, while being brought into contact with the tight side of the timing chain with a given pushing force. Thus, even if dimensions of links and pins of the timing chain or teeth of the sprockets have variations within tolerances therefor, such variations are absorbed by a push-in stroke of the chain guide against the timing chain so as to reduce an influence of the variations on a camshaft phase relative to a crankshaft phase. That is, when the crankshaft is rotated after completion of the timing-chain winding operation to allow the timing chain to conformably fit with each of the sprockets, the camshaft phase relative to the crankshaft phase can be reduced in variation, and suppressed from largely deviating from an optimal position.

Further, clearance variations in a mesh zone between the timing chain and each of the sprockets just after completion of the timing-chain winding operation, which is caused by the above dimensional variations and/or variations in quality of the winding operation can also be reduced by finally assembling the chain guide to the engine body while bringing the chain guide into contact with the tight side of the timing chain with a given pushing force.

This makes it possible to allow the crankshaft phase and the camshaft phase to be accurately set in a given relation. That is, this makes it possible to produce an engine while minimizing a deviation from an optimal phase in the crankshaft phase relative to the camshaft phase.

These and other objects, features and advantages of the invention will become more apparent upon reading the following detailed description along with the accompanying drawings.

DESCRIPTION OF THE PREFERRED EMBODIMENTS

The present invention will now be described based on an embodiment thereof. In advance of description about an engine timing system assembling method according to one embodiment of the present invention, a structure of an engine to be produced using the method will be described.

Figure 1:
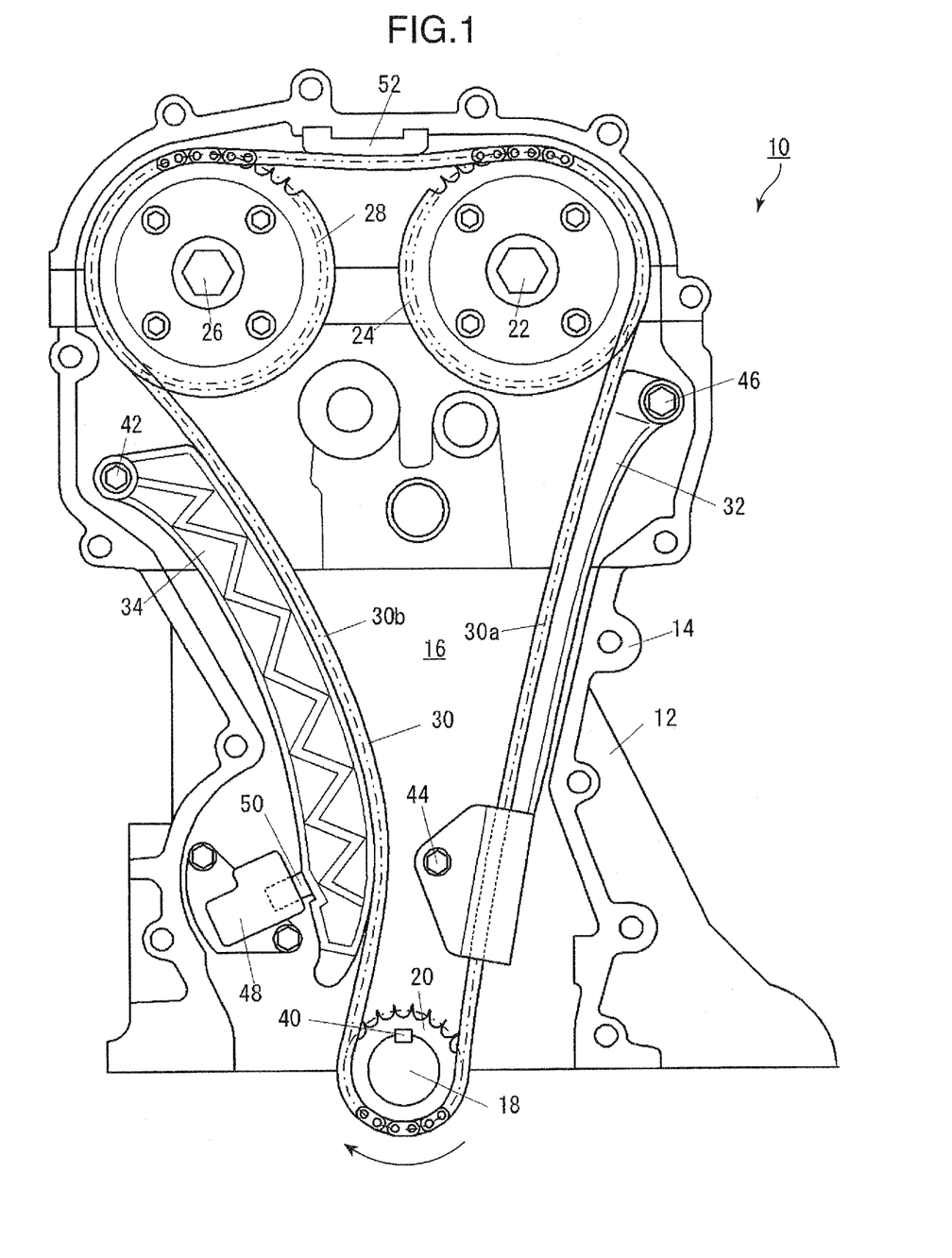
FIG. 1 is a schematic diagram showing an engine to be produced using an engine timing system assembling method according to one embodiment of the present invention.

FIG. 1 shows an engine body to be produced using the engine timing system assembling method according to this embodiment, when viewed in an axial direction (of a crankshaft and a camshaft), wherein a chain cover is detached therefrom.

An engine 10 illustrated in FIG. 1 is a DOHC (double overhead camshaft) engine having two camshafts. For example, as components of a timing system, the engine 10 includes a sprocket 20 fixed to one end of a crankshaft 18, a sprocket 24 fixed to one end of an intake camshaft 22, a sprocket 28 fixed to one end of an exhaust camshaft 26, and a timing chain 30 wound around the three sprockets 20, 24, 28, wherein these components are housed in a chain chamber 16 defined by a wall 14 protruding axially from one side surface of an engine body 12 which comprises a cylinder block, a cylinder head, and optionally a lower carrier for supporting the camshafts. In FIG. 1, during operation of the engine 10, the crankshaft 18 is drivenly rotated in a clockwise direction.

In the chain chamber 16, the timing system further includes a chain guide 32 which guides a tight side (a region between the sprocket 20 of the crankshaft 18 and the sprocket 24 of the intake camshaft 22) of the timing chain 30, and a chain tensioner arm 34 which pushes a loose side (a region between the sprocket 28 of exhaust camshaft 26 and the sprocket 20 of the crankshaft 18) of the timing chain 30 to apply a tension to the timing chain 30.

The sprocket 20 of the crankshaft 18 is fitted on one end of the crankshaft 19, and fixed to the crankshaft 19 through a key 40. The key 40 can restrict a rotation of the sprocket 20 about the crankshaft 18 (to allow the crankshaft 18 and the sprocket 20 to be rotated together).

The intake camshaft 22 is a shaft formed with an intake cam for moving an intake valve forwardly and backwardly so as to open and close an intake port, wherein the sprocket 24 is fixed to one end of the shaft.

The exhaust camshaft 26 is a shaft formed with an exhaust cam for moving an exhaust valve forwardly and backwardly so as to open and close an exhaust port, wherein the sprocket 28 is fixed to one end of the shaft.

The timing chain 30 is designed to transmit a rotation of the crankshaft 18 to each of the intake camshaft 22 and the exhaust camshaft 26, and wound around the respective sprockets 20, 24, 28 of the crankshaft 18, the intake camshaft 22 and the exhaust camshaft 26.

The chain guide 32 is a guide member designed to guide a region (tight side) of the timing chain 30 after being disengaged from the sprocket 24 of the intake camshaft 22 (i.e., after being released from a mesh engagement with teeth of the sprocket 24) to the sprocket 20 of the crank shaft 18. The chain guide 32 is fixed to the engine body 12 by two bolts 44, 46, in such a manner as to be brought into contact with the tight side of the timing chain 30 from the side of an outer peripheral surface of the timing chain 30 with a given pushing force. More specifically, the chain guide 32 is formed and arranged to protrude toward the outer peripheral surface of the timing chain 30, so that it is kept in contact with the chain guide 30 with a given pushing force.

The tensioner arm 34 is a member designed to apply a tension to a region (loose side) of the timing chain 30 after being disengaged from the sprocket 20 of the crankshaft 18, from the side of the outer peripheral surface of the timing chain 30, while guiding the loose side of the timing chain 30 to the sprocket 28 of the exhaust camshaft 26. The tension arm 34 is fixed to the engine body 12 by a bolt 42 swingably about an axis of the bolt 42.

In order to press the timing chain 30 by a given pushing force, an end of the tensioner arm 34 on the side of the crankshaft 18 is biased toward the timing chain 30 by an elastic force (corresponding to the above pushing force) of a spring (not shown) through a plunger 50 of a hydraulic tensioner 48. This plunger 50 is adapted to be moved forwardly to protrude from the tensioner 48. The tensioner 48 includes a lock mechanism (not shown) adapted to keep the plunger 50 in a retracted position 9 (where the plunger 50 is not in contact with a distal end of the tensioner arm 34).

In addition to the chain guide 32 and the tensioner arm 34, the timing system includes a guide member 52 for guiding a region of the timing chain 30 after being disengaged from the sprocket 28 of the exhaust camshaft 26 to the sprocket 24 of the intake camshaft 22.

In the engine 10 having the above structure, when the crankshaft 18 is rotated in a normal rotation direction (in FIG. 1, the clockwise direction indicated by an arrow), the timing chain 30 is circulatingly moved through the sprocket 20. Thus, according to the circulating movement of the timing chain 30, the intake camshaft 22 is rotated in the normal rotation direction through the sprocket 24, and the exhaust camshaft 26 is rotated in the normal rotation direction through the sprocket 28.

The timing chain 30 is applied with a tension by the tensioner arm 34, as mentioned above. Thus, each of the intake camshaft 22 and the exhaust camshaft 26 is rotated in such a manner that a phase of the crankshaft 18 and a phase of each of the intake and exhaust camshafts 22, 26 are kept in a given relation.

Accordingly, in each cylinder of the engine 10, opening/closing timings of intake/exhaust valves relative to a piston stroke is adequately set so as to ensure a desirable engine combustion cycle, e.g., intake, compression, expansion and exhaust strokes when the engine 10 is a four-cycle engine.

The assembling method for the timing system of the engine 10, according to this embodiment, will be described below. Specifically, this method is a technique of winding the timing chain 30, in such a manner as to allow the intake camshaft 22 and the exhaust camshaft 26 to be rotated when the crankshaft 18 is rotated after a timing-chain winding operation, under a condition that a phase of the crankshaft 18 and a phase of each of the two camshafts 22, 26 are kept in a given relation. That is, this method is a technique of winding the timing chain 30, in such a manner as to allow the phase of the crankshaft 18 and the phase of each of the two camshafts 22, 26 to be accurately kept in a given relation.

With reference to FIG. 1, a state before initiation of a timing-chain winding operation based on the method according to this embodiment will be firstly described. In this state, the timing chain 30, the chain guide 32 and the tensioner arm 34 is not assembled to the engine body 12. Further, although the sprocket 20 is fitted on the crankshaft 18, the sprocket 20 is in a rotatable state because the key 40 is not inserted. The plunger 50 of the tensioner 48 is locked in the retracted position by the lock mechanism.

Figure 2:
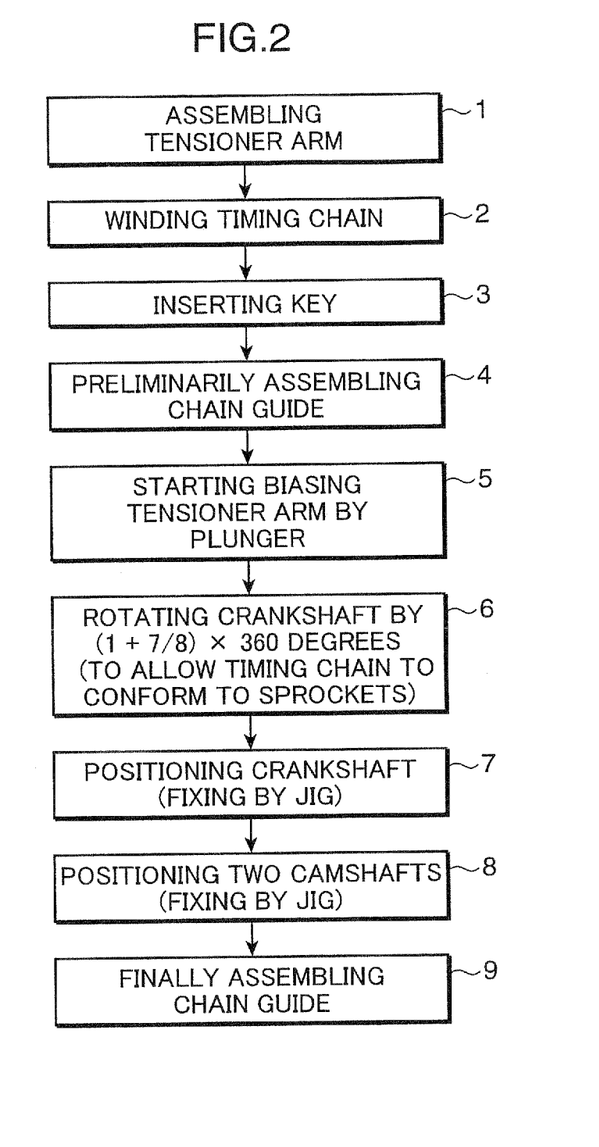
FIG. 2 is a flowchart showing steps of the engine timing system assembling method according to the embodiment.

With reference to the flowchart in FIG. 2, steps of the timing-system assembling method according to this embodiment will be described below.

In Step 1, the tensioner arm 34 is assembled to the engine body 12 by the bolt 42, as shown in FIG. 1 (which corresponds to the step of assembling, to an engine body, a tensioner arm adapted to push a loose side of the timing chain, in the appended claims). In this state, the plunger 50 of the tensioner 48 is still locked in the retracted position, and therefore the distal end of the tensioner arm 34 on the crankshaft 18 is not biased.

Figure 3:
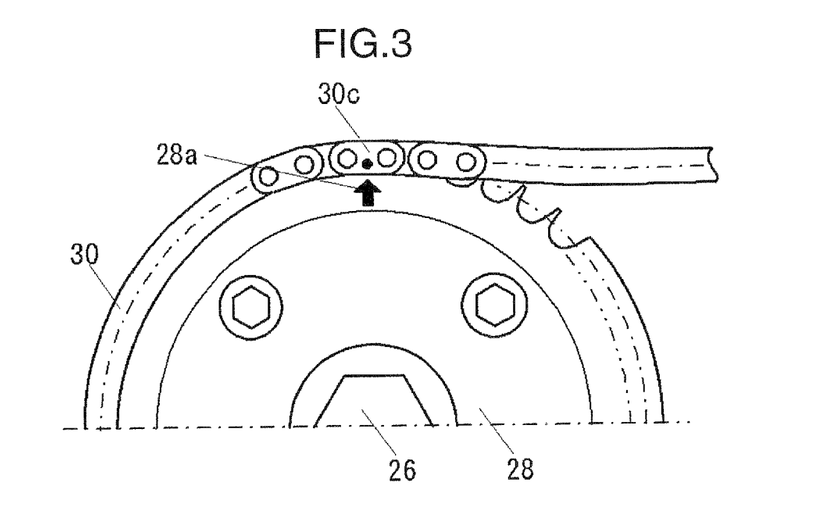
FIG. 3 is a fragmentary diagram showing a state when a timing chain is wound around a sprocket of an exhaust camshaft.
Figure 4:
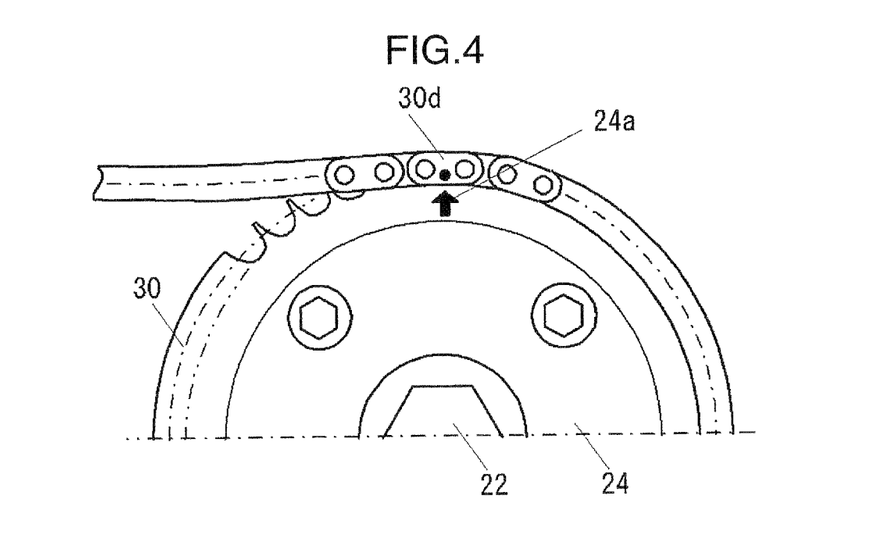
FIG. 4 is a fragmentary diagram showing a state when the timing chain is wound around a sprocket of an intake camshaft.
Figure 5:
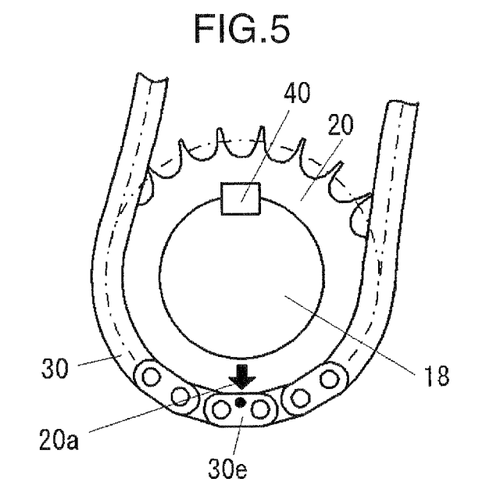
FIG. 5 is a fragmentary diagram showing a state when the timing chain is wound around a sprocket of a crankshaft.

In Step 2, the timing chain 30 is wound around the three sprockets 20, 24, 28 (which corresponds to the step of winding the timing chain around respective sprockets of the crankshaft and the camshaft, while aligning a reference mark provided on a respective one of the sprockets, with a corresponding one of alignment marks provided on the timing chain in associated relation with respective ones of the reference marks, in the appended claims). In order to adequately perform the timing-chain winding operation, as shown in FIGS. 3 to 5, a reference mark (e.g., engraved mark) (20a, 20b, 20c) is provided on a respective one of the three sprockets 20, 24, 28 in a vicinity of a base of a specific tooth thereof. Further, three alignment marks are provided on respective given ones 30c, 30d, 30e of a plurality of links of the timing chain 30 in associated relation to the respective reference marks 20a, 20b, 20c.

The timing-chain winding operation is performed while aligning the alignment mark of the link 30c with the reference mark 28a of the sprocket 28 (see FIG. 3), aligning the alignment mark of the link 30d with the reference mark 24a of the sprocket 24 (see FIG. 4), and then aligning the alignment mark of the link 30e with the reference mark 20a of the sprocket 20 (see FIG. 5). In this manner, the timing chain 30 is adequately wound around the three sprockets 20, 24, 28.

An operation of winding the timing chain 30 around the sprocket 20 of the crankshaft 18 is performed after the timing chain 30 is wound around the sprockets 24, 28. The reason is that the sprocket 20 is rotatably fitted on the crankshaft 18 (because the key 40 is not inserted), and thereby the timing chain 30 can be easily wound around the sprocket 20, i.e., can be wound around the sprocket 20 while rotating the sprocket 20, even if the winding operation to the sprocket 20 is performed after the winding operation to the sprockets 24, 28 which are kept in an unrotatable state as will be described later.

In this embodiment, the timing chain 30 is wound around the sprocket 28 of the exhaust camshaft 26 before it is wound around the sprocket 24 of the exhaust camshaft 22. Alternatively, this operation may be performed in reverse order.

More specifically, a reference position is set for each of the reference marks 20a, 24a, 28a of the three sprockets 20, 24, 28, and, in advance of the timing-chain winding operation, a phase position of the crankshaft 18 and respective phase positions of the two camshafts 22, 26 are adjusted such that the reference positions 20a, 24a, 28a are located approximately at corresponding ones of the three reference positions.

When the three reference marks 20a, 24a, 28a are accurately located at the corresponding ones of the three reference positions (and when the key 40 is inserted to fix the sprocket 20 to the crankshaft 18), for example, when each of the reference marks 24a, 28a of the sprockets 24, 28 of the camshafts 22, 26 is accurately located at a position (e.g., twelve o'clock potion) of an engraved mark provided on the engine body 12 to indicate a corresponding one of the reference positions, and the reference marks 20a of the sprocket 20 of the crankshaft 20 is also accurately located at a position (e.g., six o'clock potion) of an engraved mark provided on the engine body 12 to indicate the corresponding reference position, the crankshaft 18 is located at a reference phase position thereof, and each of the camshafts 22, 26 are also located at a reference phase position thereof. This is a reference phase position of the engine 10. For example, the engine 10 is configured (designed) such that, when the engine 10 is at the reference phase position, a piston of a cylinder No. 1 of the engine 10 is located at a position of TDC on a compression stroke.

Returning to FIG. 2, in Step 3, the key 40 is inserted, so that the sprocket 20 is fixed to the crankshaft 10 in such a manner as to prohibit rotation thereof relative to the crankshaft 18. If the timing chain 30 can be easily wound around the sprocket 20 without rotation of the sprocket 20, the key insertion operation may be performed before or after Step 1.

In Step 4, the chain guide 32 is preliminarily assembled to the engine body 12 (which corresponds to the step of preliminarily assembling, to the engine body, a chain guide adapted to be brought into contact with a tight side of the timing chain, in the appended claims). This operation will be specifically described with reference to FIG. 6. A first end of the chain guide 32 on the side of the crankshaft 18 is preliminarily fixed by the bolt 44 rotatably about an axis of the bolt 44 (the bolt 44 is preliminarily fastened).

Figure 6:
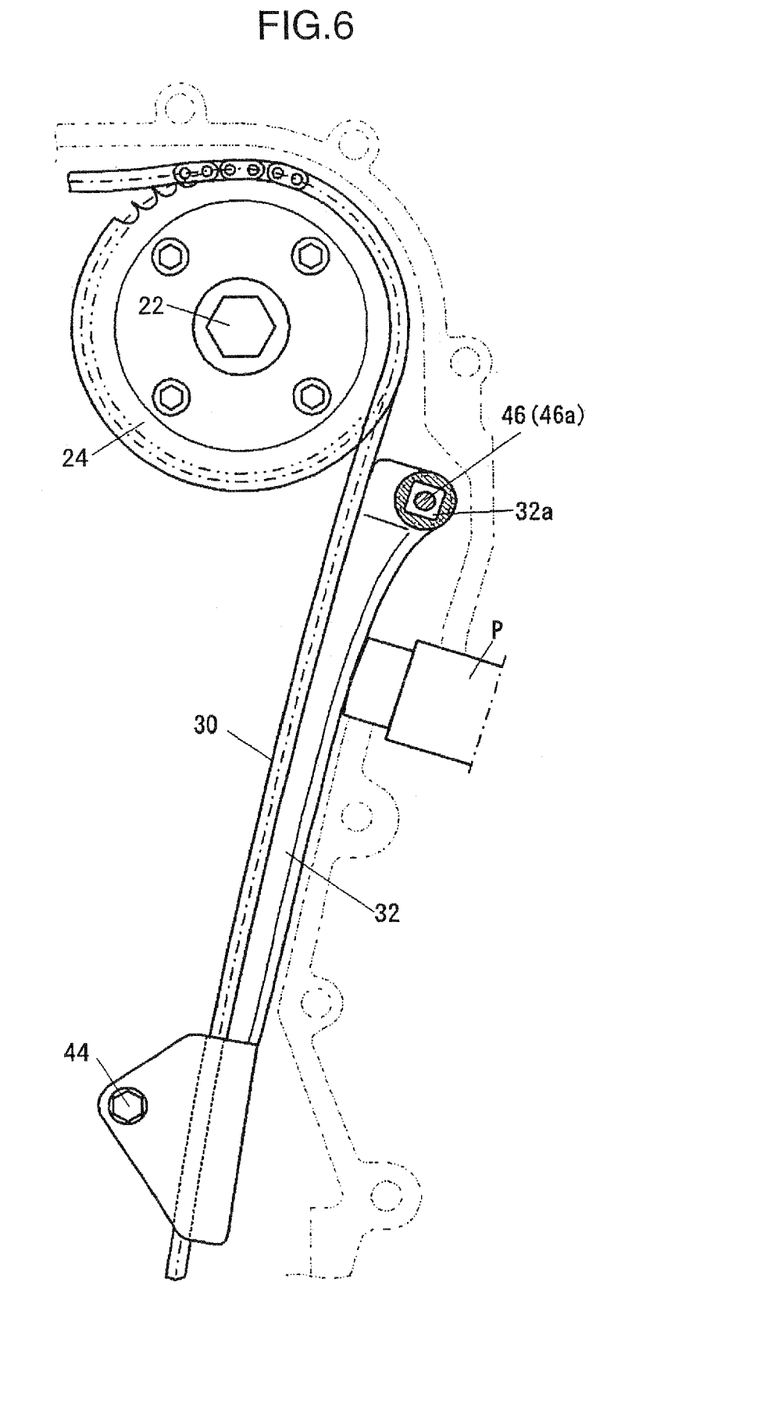
FIG. 6 is an explanatory diagram of an assembling operation for a chain guide.

This preliminary fixing operation is performed in such a manner that an externally threaded portion of the bolt 44 is inserted into a through-hole of the chain guide 32, and then screwed with an internally threaded portion of the engine body 12, while preventing a head of the bolt 44 from being strongly brought into contact with the chain guide 32, i.e., preventing the chain guide 32 from being strongly clamped between the engine body 12 and the head of the bolt 44 to become unrotatable.

After completion of the operation of preliminarily fixing the chain guide 32 by the bolt 44, a second end of the chain guide 32 on the side of the intake camshaft 22 is preliminarily fixed by the bolt 46 while preventing a head of the bolt 46 from being strongly brought into contact with the chain guide 32, in the same manner as that for the bolt 44 (the bolt 46 is preliminarily fastened). A through-hole 32a of the chain guide 32 for inserting the bolt 46 thereinto has a size than an outer diameter of a shank 46a of the bolt 46, and a generally rectangular shape in cross-section. This configuration is employed in consideration of a manufacturing error "deviation within tolerance" of the chain guide 32 (and/or a pitch error "deviation within tolerance" in two internally threaded portions of the engine body 12 to be engaged with the bolts 44, 46), and to adjust a push-in amount of the chain guide 32 toward the timing chain 32 so as to allow the timing chain 30 to be brought into contact with the chain guide 32 with a given pushing force.

In Step 5, the locked state of the tensioner 48 by the lock mechanism is released to allow the plunger 50 of the tensioner 34 to start biasing the tensioner arm 34. Thus, the tensioner arm 34 pushes the timing chain 30 by a given pushing force.

In Step 6, the crankshaft 18 is rotated in the normal rotation direction to allow the timing chain 30 to conformably fit with each of the three sprockets 20, 24, 26 (a mesh engagement between the timing chain 30 and each of the three sprockets 20, 24, 26 just after completion of the timing-chain winding operation is deepened by a tension applied thereto). In this operation, the crankshaft 18 is rotated from a position around the reference phase position thereof (or around the reference phase position of the engine 10) in the normal rotation direction (in the clockwise direction indicated by the arrowed line in FIG. 7) by about $(1+7/8) \times 360$ degrees. This reason will be described later.

In Step 7, the crankshaft 18 is positioned at the reference phase position thereof (which corresponds to the step of positioning the crankshaft at a reference phase position thereof, in the appended claims). Specifically, the crankshaft 18 is positioned in such a manner that the reference mark 20a of the sprocket 20 fixed to the crankshaft 18 through the key 40 is located at the corresponding reference position, i.e., the engine 10 is set at the reference phase position.

Figure 7:
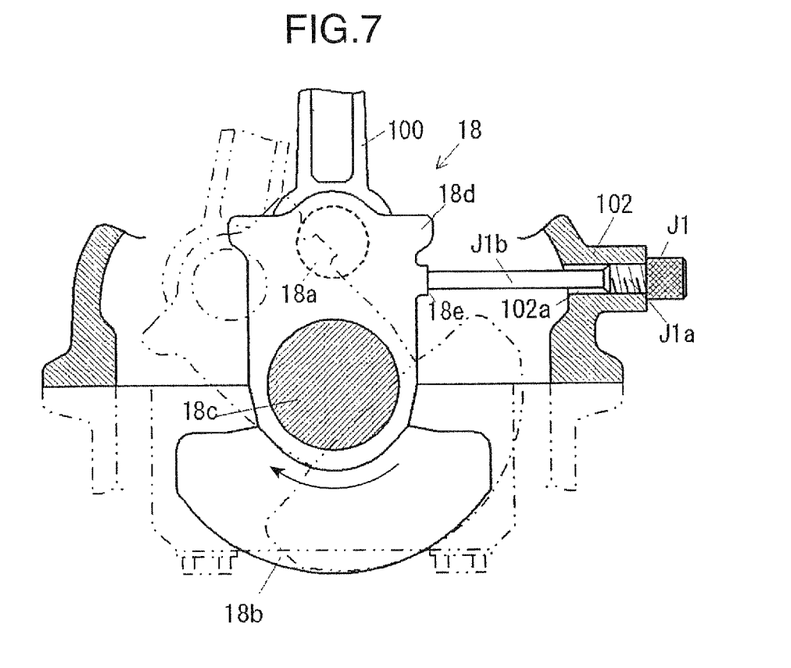
FIG. 7 is an explanatory diagram of a positioning operation for a crankshaft.

With reference to FIG. 7, the operation of positioning the crankshaft 18 will be described. FIG. 7 shows the crankshaft 18 in the engine 10, particularly a crankarm and a vicinity thereof, when viewed in the axial direction. The crankshaft 18 is positioned using a crankarm 18d which has one end supporting a connecting rod 100 through a crankpin 18a and the other end formed with a counterweight 18b and is adapted to be rotated about a shaft center of a crank journal 18c. Specifically, a rotation of the crankarm 18d is restricted to allow the crankshaft 18 to be positioned at the reference phase position thereof (allow the engine 10 to be set at the reference phase position thereof). For this purpose, a jig J1 is used. The jig J1 has a bolt-like shape which has a head-side shank J1a having an external thread screwable with an internally threaded portion formed on an outward side of a through-hole 102a of a cylinder block 102, and a rotation restriction portion J1b extending from the head-side shank J1a and having a distal end to come into contact with the crankarm 18d. The crankarm 18d has a contact portion 18e formed at a position where the crankarm 18d is brought into contact with the distal end of the rotation restriction portion J1b of the jig J1 when the crankshaft 18 is rotated to the reference phase position thereof.

A process of positioning the crankshaft 18 by the jig J1 will be described below. In the preceding step, the crankshaft 18 is rotated from a position around the reference phase position thereof (or around the reference phase position of the engine 10) in the normal rotation direction by about $(1+7/8) \times 360$ degrees (i.e., the crankarm 18d is in an inclined position as indicated by the two-dot chain line in FIG. 7). Under the condition that the crankarm 18d is in the inclined position, the jig J1 is fixed to the cylinder block 102. After completion of the fixing operation, the crankshaft 18 is rotated in the normal rotation direction (in the clockwise direction indicated by the arrowed line in FIG. 7) by about $1/8 \times 360$ degrees. Thus, the contact portion 18e of the crankarm 18 is brought into contact with the distal end of the rotation restriction portion J1b of the jig J1, to restrict the crankarm 18d from being further rotated, so that the crankshaft 18 is positioned at the reference phase position thereof.

In Step 8, each of the two camshafts 22, 26 is positioned at a corresponding one of the reference phase positions (which corresponds to the step of positioning the camshaft at a reference phase position thereof, in the appended claims). Specifically, each of the two camshafts 22, 26 is positioned in such a manner that the reference marks 24a, 28a of the sprockets 24, 28 fixed to the two camshafts 22, 26 are located at corresponding ones of the reference positions, i.e., the engine 10 is set at the reference phase position thereof.

Figure 8:
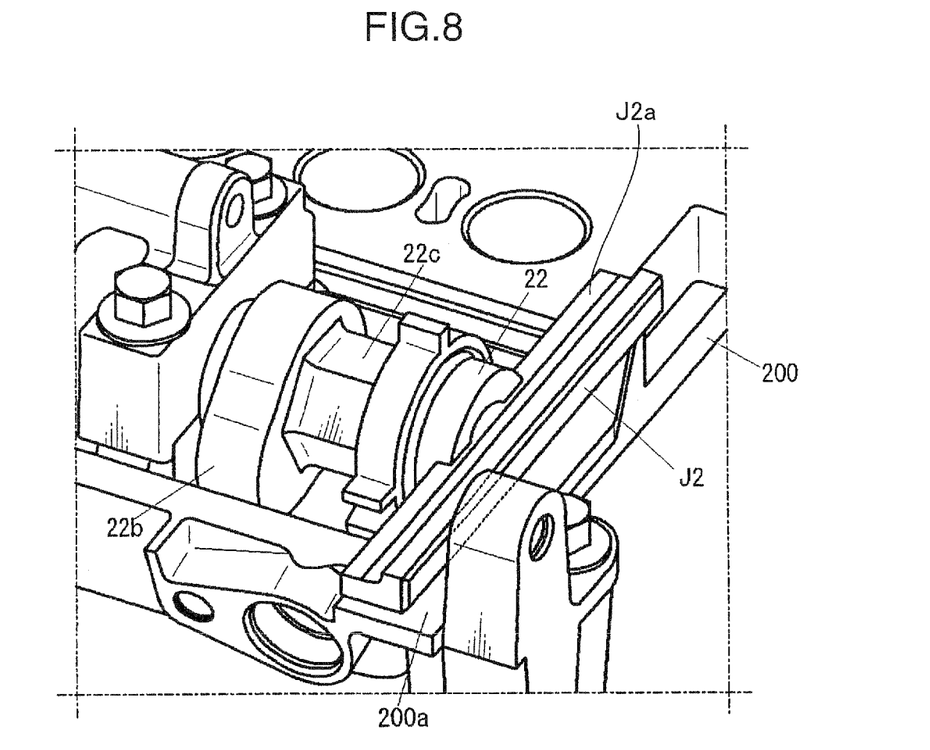
FIG. 8 is an explanatory diagram of a positioning operation for a camshaft.

With reference to FIG. 8, the operation of positioning the two camshafts 22, 26 will be described below. FIG. 8 shows a positioned intake camshaft 22.

Figure 9:
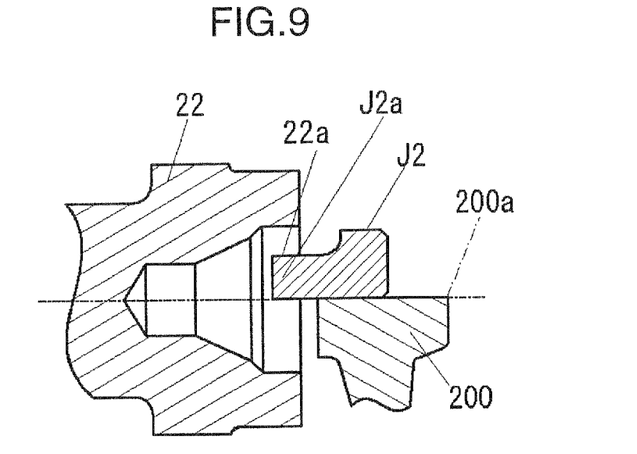
FIG. 9 is another explanatory diagram of the positioning operation for the camshaft.

The intake camshaft 22 is positioned using a rear end thereof on an opposite side of a front end thereof having the sprocket 24 fixed thereon. Specifically, as shown in FIG. 9 which is a sectional view of an rear edge of the positioned intake camshaft 22, the positioning operation is performed by fitting a jig J2 into a groove 22a formed in the rear edge of the intake camshaft 22. As shown in FIG. 8, the jig J2 is an member having a L shape in section taken along a direction perpendicular to a longitudinal direction thereof. During the positioning operation, the jig J2 is placed on a mating surface 200a of a cylinder head (or lower carrier) 200 with a cylinder head cover, and a distal edge J2a is fitted into a groove 22a of the intake camshaft 22.

The groove 22a of the intake camshaft 22 is formed to allow the distal edge J2a of the jig J2 to be fitted thereinto when the intake camshaft 22 is located at the reference phase position thereof. Thus, as shown in FIG. 8, the operation of fitting jig J2 into the groove 22a is performed, after a regular hexagonal-shaped portion 22c provided adjacent to an intake cam 22b formed in the intake camshaft 22 is rotated by a spanner so as to position the intake camshaft 22 at the reference phase position thereof.

When the jig J2 is fitted into the groove 22a, the intake camshaft 22 is precluded from being rotated (i.e., becomes unrotatable), and positioned at the reference phase position thereof. Further, when the intake camshaft 22 is positioned, a phase of the sprocket 28 of the exhaust camshaft 26 disposed adjacent to the intake camshaft 22 is fixed by an upper region of the timing chain 30, and therefore the exhaust camshaft 26 is also positioned indirectly.

After completion of the operation of positioning the crankshaft 22 and the operation of positioning the two camshafts 22, 26, the chain guide 32 preliminarily assembled in Step 8 (4?) is finally assembled to the engine body 12 (which corresponds to the step of finally assembling, to the engine body, the chain guide preliminarily assembled in the step (3), while bringing the chain guide into contact with the tight side of the timing chain with a given pushing force, in the appended claims).

With reference to FIG. 6, this operation will be described below. The chain guide 32 is pushed toward the timing chain 30 by a "given pushing force" using a push/pull gauge P or the like, and the two preliminarily-fastened bolts 44, 46 are finally fastened while maintaining the "given pushing force" (while bringing the chain guide 32 into contact with the timing chain 32 with the "given pushing force"). In this manner, the chain guide 32 is fixed to the engine body 12 while being kept in contact with the timing chain 30 with the given pushing force.

The "given pushing force" is set such that a force for causing the crankshaft 18 to be rotated in a reverse rotation direction through the timing chain 30 pushed by the given pushing force has a magnitude equal to or greater than that of a force for causing the crankshaft 18 to be rotated in the normal rotation direction through the timing chain 30 pushed by the given pushing force (under a condition that the tensioner arm 34 pushes the timing chain 30). This makes it possible to prevent the occurrence of an undesirable situation where, during the operation of finally assembling the chain guide 32 to the engine body 12 while bringing the chain guide 32 into contact with the timing chain 30, the crankshaft restricted from being rotated in the normal rotation direction by the jig J1 is rotated in the reverse rotation direction (The two camshafts 22, 26 are prevented from rotation because the rotation of the intake camshaft 22 in both the normal and reverse directions is restricted by the jig J2"). In addition, the "given pushing force" provides an initial tension to the timing chain 30.

As above, in the engine timing system assembling method according this embodiment, even if dimensions of links and pins of the timing chain 30 or teeth of the three sprockets 20, 24, 28 have variations within tolerances therefor, the chain guide 32 is finally assembled to the engine body 12 while being brought into contact with the tight side of the timing chain 30 with the given pushing force, under the condition that the crankshaft 18 and the two camshafts 22, 26 wound by the timing chain 30 are positioned at corresponding ones of the reference phase positions by the jigs J1, J2, (specifically, such variations are absorbed by a push-in stroke of the chain guide 32 against the timing chain 30), so as to reduce an influence of the variations on respective phases of the intake and exhaust camshafts 22, 26 relative to a phase of the crankshaft 18. That is, when the crankshaft 18 is rotated after completion of the timing-chain winding operation to allow the timing chain 30 to conformably fit with each of the three sprockets 20, 24, 28, the phases of the two camshafts 22, 26 relative to the phase of the crankshaft 18 can be reduced in variation, and suppressed from largely deviating from an optimal position.

Further, clearance variations in a mesh zone between the timing chain 30 and each of the three sprockets 20, 24, 28 just after completion of the timing-chain winding operation, which is caused by the above dimensional variations and/or variations in quality of the winding operation can also be reduced by finally assembling, to the engine body 12, the chain guide 32 while bringing the chain guide 32 into contact with the tight side of the timing chain 30 with the given pushing force.

This makes it possible to allow the phase of the crankshaft 18 and each of the phases of the two camshafts 22, 26 to be accurately set in a given relation. That is, this makes it possible to produce the engine 10 while minimizing a deviation from an optimal phase in each of the phases of the crankshafts 22, 26 relative to the phase of the camshaft 18.

In the above manner, a deviation from an optimal phase in each of the phases of the crankshafts 22, 26 relative to the phase of the camshaft 18 is minimized. Thus, a deviation in the opening/closing timings of the intake/exhaust valves is minimized, and deterioration in combustion performance of the engine 10 is suppressed. Particularly, in a high-compression engine having a high compression ratio, for example, of 13 or more, a pre-ignition which would be otherwise caused by a deviation from an optimal phase in each of the phases of the crankshafts 22, 26 relative to the phase of the camshaft 18 is suppressed.

Although the present invention has been described based on one embodiment thereof, the present invention is not limited to the specific embodiment.

For example, in the above embodiment, the present invention has been applied to a DOHC engine having two camshafts. It is understood that the present invention may also be applied to a SOHC engine having one camshaft.

In the above embodiment, each of the crankshaft 18 and the two camshafts 22, 26 is positioned at the reference phase position thereof in an unrotatable manner (accurately, the crankshaft 18 is unrotatable only in the normal rotation direction). If there is not a risk that each of the crankshaft 18 and the two camshafts 22, 26 is rotated during the operation of finally assembling the chain guide to the engine body while bringing the chain guide into contact with the tight side of the timing chain with the given pushing force, each of the crankshaft 18 and the two camshafts 22, 26 may be simply positioned at the reference phase position thereof without precluding rotation thereof (or without restricting rotation thereof). Further, the crankshaft and all the camshafts may be positioned in such a manner as to prohibit rotation thereof. Furthermore, the crankshaft may be positioned in such a manner as to prohibit rotation thereof in both the normal and reverse directions.

In the above embodiment, after the operation of winding the timing chain 30 around the three sprockets 20, 24, 28, the crankshaft 18 is rotated by (1+⅞)×360 degrees. The value of the rotation angle is not limited to this value, but may be any other suitable value allowing the timing chain 30 to conformably fit with each of the three sprockets 20, 24, 28.

However, in order to prevent the occurrence of an undesirable situation that, when the jig J1 for positioning the crankshaft at the reference phase position thereof is fixed to the cylinder block, the distal end of the rotation restriction portion J1b of the jig J1 is brought into contact with a portion other than the contact portion 18e, such as the balance weight (counter weight) 18b, or in order to allow the contact portion 18e to be brought into contact with the distal end of the rotation restriction portion J1b after the jig J1 is fixed to the cylinder block 102, it is desirable that the crankshaft 18 is rotated before the jig J1 is fixed to the cylinder block 102. For this purpose, the crankshaft 18 is rotated from a position around the reference phase position thereof by about (1+⅞)×360 degrees.

In the above embodiment, after the timing chain 30 is wound around the three sprockets 20, 24, 28, the crankshaft 18 is rotated to allow the timing chain 30 to conformably fit with the three sprockets 20, 24, 28, i.e., to reduce an irregular clearance in the mesh region just after completion of the timing-chain winding operation. However, if such an irregular clearance can be reduced by finally assembling the chain guide to the engine body while bringing the chain guide into contact with the tight side of the timing chain with the given pushing force, this operation for obtaining conformable fitting may be omitted.

As above, the engine timing system assembling method of the present invention makes it possible to wind a timing chain around respective sprockets of a crankshaft and a camshaft in such a manner as to allow a crankshaft phase and a camshaft phase to be accurately set in a given relation. Thus, the present invention can be suitably used in the field of engine manufacturing industries.

The present invention can be summarized as follows.

The present invention provides an assembling method for a timing system of an engine to wind a timing chain around a sprocket attached to a crankshaft and a sprocket attached to a camshaft. The assembling method comprises the steps of (1) assembling, to an engine body, a tensioner arm adapted to push a loose side of the timing chain, (2) winding the timing chain around the respective sprockets of the crankshaft and the camshaft, while aligning a reference mark provided on a respective one of the sprockets, with a corresponding one of alignment marks provided on the timing chain in associated relation with respective ones of the reference marks, (3) preliminarily assembling, to the engine body, a chain guide adapted to be brought into contact with a tight side of the timing chain, (4) positioning the crankshaft at a reference phase position thereof, (5) positioning the camshaft at a reference phase position thereof, and (6) finally assembling, to the engine body, the chain guide preliminarily assembled in the step (3), while bringing the chain guide into contact with the tight side of the timing chain with a given pushing force.

In the assembling method of the present invention, after winding the timing chain around the sprockets while aligning the reference mark provided on a respective one of the sprockets, with a corresponding one of the alignment marks provided on the timing chain, each of the crankshaft and the camshaft is positioned at the reference phase position thereof. Then, in this state, the chain guide preliminarily assembled to the engine body can be finally assembled to the engine body, while being brought into contact with the tight side of the timing chain with a given pushing force.

Specifically, under a condition that each of the crankshaft and the camshaft having the sprockets wound by the timing chain is positioned at the reference phase position thereof, the chain guide is finally assembled to the engine body, while being brought into contact with the tight side of the timing chain with a given pushing force. Thus, even if dimensions of links and pins of the timing chain or teeth of the sprockets have variations within tolerances therefor, such variations are absorbed by a push-in stroke of the chain guide against the timing chain so as to reduce an influence of the variations on a camshaft phase relative to a crankshaft phase. That is, when the crankshaft is rotated after completion of the timing-chain winding operation to allow the timing chain to conformably fit with each of the sprockets, the camshaft phase relative to the crankshaft phase can be reduced in variation, and suppressed from largely deviating from an optimal position.

Further, clearance variations in a mesh zone between the timing chain and each of the sprockets just after completion of the timing-chain winding operation, which is caused by the above dimensional variations and/or variations in quality of the winding operation can also be reduced by finally assembling the chain guide to the engine body while bringing the chain guide into contact with the tight side of the timing chain with a given pushing force.

This makes it possible to allow the crankshaft phase and the camshaft phase to be accurately set in a given relation. That is, this makes it possible to produce an engine while minimizing a deviation from an optimal phase in the crankshaft phase relative to the camshaft phase.

Preferably, in the assembling method of the present invention, the step (4) includes the sub-steps of: rotating the crankshaft to a preliminary phase position where a given phase angle is left before reaching the reference phase position thereof; under the condition that the crankshaft is at the preliminary phase position, assembling, to the engine body, a jig adapted to position the crankshaft at the reference phase position thereof; and rotating the crankshaft until it is positioned by the jig.

According to this feature, the crankshaft is rotated before the crankshaft is positioned, and the timing chain is rotated in conjunction with the rotation of the crankshaft, so that, before the step (6) of finally assembling the chain guide to the engine body while bringing the chain guide into contact with the tight side of the timing chain with a given pushing force, an irregular clearance in the mesh region between the timing chain and each of the sprockets can be reduced. Thus, in addition to the effect of the step (6), an irregular clearance in the mesh region between the timing chain and each of the sprockets can be further reduced to allow a crankshaft phase and a camshaft phase to be more accurately set in a given relation.

Preferably, in the assembling method of the present invention, the step (5) includes positioning the camshaft at the reference phase position thereof in such a manner as to prohibit rotation of the camshaft.

According to this feature, in the step (6) of finally assembling the chain guide to the engine body while bringing the chain guide into contact with the tight side of the timing chain with a given pushing force, a rotation of the camshaft by the timing chain can be avoided. This makes it possible to reliably set a given relation between a crankshaft phase and a camshaft phase.

Preferably, in the assembling method of the present invention, the tensioner arm is adapted to be biased by a spring force through a plunger of a tensioner so as to push the loose side of the timing chain by a given pushing force, wherein the assembling method includes, between the step (3) and the step (4), the step of biasing the tensioner arm by the plunger, and wherein the given pushing force in the step (6) is set such that a force for causing the crankshaft to be rotated in a reverse rotation direction through the timing chain pushed by the given pushing force has a magnitude equal to or greater than that of a force for causing the crankshaft to be rotated in a normal rotation direction through the timing chain pushed by the given pushing force.

According to this feature, in the step (6) of finally assembling the chain guide to the engine body while bringing the chain guide into contact with the tight side of the timing chain with a given pushing force, an initial tension can applied to the timing chain while preventing the crankshaft and the camshaft from being rotated by the timing chain.

Even if the engine is a spark-ignition engine including at least an operating range where it is operated at an effective compression ratio of 13 or more, the assembling method makes it possible to allow a crankshaft phase and a camshaft phase to be accurately set in a given relation so as to suppress the occurrence of pre-ignition.

This application is based on Japanese Patent Application Serial No. 2008-074873, filed in Japan Patent Office on Mar. 24, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An assembling method for a timing system of an engine to wind a timing chain around a sprocket attached to a crankshaft and a sprocket attached to a camshaft, comprising the steps of:
   (1) assembling, to an engine body, a tensioner arm adapted to push a loose side of the timing chain;
   (2) winding the timing chain around the sprockets of the crankshaft and the camshaft, while aligning a reference mark provided on a respective one of the sprockets, with a corresponding one of alignment marks provided on the timing chain in associated relation with the respective ones of the reference marks;
   (3) preliminarily assembling, to the engine body, a chain guide adapted to be brought into contact with a tight side of the timing chain;
   (4) positioning the crankshaft at a reference phase position thereof;
   (5) positioning the camshaft at a reference phase position thereof; and
   (6) finally assembling, to the engine body, the chain guide preliminarily assembled in the step (3), while bringing the chain guide into contact with the tight side of the timing chain with a given pushing force.

2. The assembling method according to claim 1, wherein the step (4) includes sub-steps of:
   rotating the crankshaft to a preliminary phase position where a given phase angle is left before reaching the reference phase position thereof;
   under a condition that the crankshaft is at the preliminary phase position, assembling, to the engine body, a jig adapted to position the crankshaft at the reference phase position thereof; and
   rotating the crankshaft until the crankshaft is positioned by the jig.

3. The assembling method according to claim 1, wherein the step (5) includes positioning the camshaft at the reference phase position thereof in such a manner as to prohibit rotation of the camshaft.

4. The assembling method according to claim 1, wherein the tensioner arm is adapted to be biased by a spring force through a plunger of a tensioner so as to push the loose side of the timing chain by the given pushing force, wherein the assembling method includes, between the step (3) and the step (4), a step of biasing the tensioner arm by the plunger, and wherein the given pushing force in the step (6) is set such that a force for causing the crankshaft to be rotated in a reverse rotation direction through the timing chain pushed by the given pushing force has a magnitude equal to or greater than that of a force for causing the crankshaft to be rotated in a normal rotation direction through the timing chain pushed by the given pushing force.

5. The assembling method according to claim 1, wherein the engine is a spark-ignition engine including at least an operating range where the engine is operated at an effective compression ratio of 13 or more.

6. The assembling method according to claim 2, wherein the step (5) includes positioning the camshaft at the reference phase position thereof in such a manner as to prohibit rotation of the camshaft.

7. The assembling method according to claim 6, wherein the tensioner arm is adapted to be biased by a spring force through a plunger of a tensioner so as to push the loose side of the timing chain by the given pushing force, wherein the assembling method includes, between the step (3) and the step (4), a step of biasing the tensioner arm by the plunger, and wherein the given pushing force in the step (6) is set such that a force for causing the crankshaft to be rotated in a reverse rotation direction through the timing chain pushed by the given pushing force has a magnitude equal to or greater than that of a force for causing the crankshaft to be rotated in a normal rotation direction through the timing chain pushed by the given pushing force.

8. The assembling method according to claim 7, wherein the engine is a spark-ignition engine including at least an operating range where the engine is operated at an effective compression ratio of 13 or more.

9. The assembling method according to claim 3, wherein the step (4) includes sub-steps of:
   rotating the crankshaft to a preliminary phase position where a given phase angle is left before reaching the reference phase position thereof;
   under a condition that the crankshaft is at the preliminary phase position, assembling, to the engine body, a jig adapted to position the crankshaft at the reference phase position thereof; and
   rotating the crankshaft until the crankshaft is positioned by the jig.

10. The assembling method according to claim 9, wherein the tensioner arm is adapted to be biased by a spring force through a plunger of a tensioner so as to push the loose side of the timing chain by the given pushing force, wherein the assembling method includes, between the step (3) and the step (4), a step of biasing the tensioner arm by the plunger, and wherein the given pushing force in the step (6) is set such that a force for causing the crankshaft to be rotated in a reverse rotation direction through the timing chain pushed by the given pushing force has a magnitude equal to or greater than that of a force for causing the crankshaft to be rotated in a normal rotation direction through the timing chain pushed by the given pushing force.

11. The assembling method according to claim 10, wherein the engine is a spark-ignition engine including at least an operating range where the engine is operated at an effective compression ratio of 13 or more.

12. The assembling method according to claim 4, wherein the step (4) includes sub-steps of:
   rotating the crankshaft to a preliminary phase position where a given phase angle is left before reaching the reference phase position thereof;
   under a condition that the crankshaft is at the preliminary phase position, assembling, to the engine body, a jig adapted to position the crankshaft at the reference phase position thereof; and
   rotating the crankshaft until the crankshaft is positioned by the jig.

13. The assembling method according to claim 12, wherein the step (5) includes positioning the camshaft at the reference phase position thereof in such a manner as to prohibit rotation of the camshaft.

14. The assembling method according to claim 13, wherein the engine is a spark-ignition engine including at least an operating range where the engine is operated at an effective compression ratio of 13 or more.

15. The assembling method according to claim 5, wherein the step (4) includes sub-steps of:
- rotating the crankshaft to a preliminary phase position where a given phase angle is left before reaching the reference phase position thereof;
- under a condition that the crankshaft is at the preliminary phase position, assembling, to the engine body, a jig adapted to position the crankshaft at the reference phase position thereof; and
- rotating the crankshaft until the crankshaft is positioned by the jig.

16. The assembling method according to claim 15, wherein the step (5) includes positioning the camshaft at the reference phase position thereof in such a manner as to prohibit rotation of the camshaft.

17. The assembling method according to claim 16, wherein the tensioner arm is adapted to be biased by a spring force through a plunger of a tensioner so as to push the loose side of the timing chain by the given pushing force, wherein the assembling method includes, between the step (3) and a step (4), the step of biasing the tensioner arm by the plunger, and wherein the given pushing force in the step (6) is set such that a force for causing the crankshaft to be rotated in a reverse rotation direction through the timing chain pushed by the given pushing force has a magnitude equal to or greater than that of a force for causing the crankshaft to be rotated in a normal rotation direction through the timing chain pushed by the given pushing force.

18. The assembling method according to claim 2, wherein the engine is a spark-ignition engine including at least an operating range where the engine is operated at an effective compression ratio of 13 or more.

19. The assembling method according to claim 3, wherein the engine is a spark-ignition engine including at least an operating range where the engine is operated at an effective compression ratio of 13 or more.

20. The assembling method according to claim 4, wherein the engine is a spark-ignition engine including at least an operating range where the engine is operated at an effective compression ratio of 13 or more.

* * * * *